(12) United States Patent
Kinoshita et al.

(10) Patent No.: US 11,459,239 B2
(45) Date of Patent: Oct. 4, 2022

(54) GRAPHENE, DEVICE FOR PRODUCING GRAPHENE, AND METHOD FOR PRODUCING GRAPHENE

(71) Applicants: JIKAN TECHNO, Inc., Hyogo (JP); Hideo Sakamoto, Aichi (JP); Takahiro Kinoshita, Hyogo (JP)

(72) Inventors: Takahiro Kinoshita, Hyogo (JP); Keishin Ota, Ibaraki (JP)

(73) Assignees: JIKAN TECHNO, INC., Hyogo (JP); HIDEO SAKAMOTO, Aichi (JP); TAKAHIRO KINOSHITA, Hyogo (JP)

( * ) Notice: Subject to any disclaimer, the term of this patent is extended or adjusted under 35 U.S.C. 154(b) by 354 days.

(21) Appl. No.: 16/425,073

(22) Filed: May 29, 2019

(65) Prior Publication Data

US 2020/0002175 A1 Jan. 2, 2020

(30) Foreign Application Priority Data

Jun. 29, 2018 (JP) .............................. JP2018-125145
Sep. 26, 2018 (JP) .............................. JP2018-179780

(51) Int. Cl.
*C01B 32/184* (2017.01)
*C10B 53/02* (2006.01)
(Continued)

(52) U.S. Cl.
CPC ............ *C01B 32/184* (2017.08); *C10B 49/02* (2013.01); *C10B 53/02* (2013.01); *B82Y 40/00* (2013.01); *C01B 2204/30* (2013.01); *C10B 57/04* (2013.01)

(58) Field of Classification Search
CPC .............. C01B 32/184; C01B 2204/30; C01B 2204/02; C01B 32/196; C01B 32/182; C01B 32/198; C01B 2204/00; C01B 2204/04; C01B 2204/06; C01B 2204/065; C01B 2204/20; C01B 2204/22; C01B 2204/24; C01B 2204/26; C01B 2204/28; C01B 2204/32; C01B 32/20; C01B 32/205; C01B 32/21; C01B 32/215; C01B 32/22;
(Continued)

(56) References Cited

FOREIGN PATENT DOCUMENTS

| JP | 2009-242180 | 10/2009 |
| JP | 2010-042935 | 2/2010 |
| WO | 2013/058382 | 4/2013 |

OTHER PUBLICATIONS

Shah, et al., Plasma Synthesis of Graphene from Mango Peel, ACS Omega 2018; 3: 455-463, with Supporting Information (Year: 2018).*

(Continued)

*Primary Examiner* — Daniel C. McCracken
(74) *Attorney, Agent, or Firm* — Greenblum & Bernstein, P.L.C.

(57) ABSTRACT

A method for producing graphene includes:
a pretreatment process of drying and pulverizing a vegetable material to obtain a carbon source;
a carbonization process of carbonizing the carbon source to obtain a carbide; and
a purification process of removing an impurity containing silica from the carbide obtained in the carbonization process, wherein the carbonization process including a heating process of supplying an inert gas into a chamber and heating the carbon source in the chamber in a plasma atmosphere.

1 Claim, 17 Drawing Sheets

(51) Int. Cl.
*C10B 49/02* (2006.01)
*C10B 57/04* (2006.01)
*B82Y 40/00* (2011.01)

(58) Field of Classification Search
CPC ....... C01B 32/225; C01B 32/23; C10B 53/02; C10B 49/02; C10B 57/04; B82Y 40/00; Y02E 50/10
See application file for complete search history.

(56) References Cited

OTHER PUBLICATIONS

Jacob, et al., Catalyst-Free Plasma Enhanced Growth of Graphene from Sustainable Sources, Nano Letters 2015; 15: 5702-5708 (Year: 2015).*

Jalili, et al., Silicon as a ubiquitous contaminant in graphene derivatives with significant impact on device performance, NatureCommunications 2018; 9: 5070: pp. 1-13 (Year: 2018).*

Wang, et al., Nanocarbons from rice husk by microwave plasma irradiation: From graphene and carbon nanotubes to graphenated carbon nanotube hybrids, Carbon 2015; 94: 479-484 with Supporting Information (Year: 2015).*

Muramatsu, et al., Rice Husk-Derived Graphene with Nano-Sized Domains and Clean Edges, Small 2014; 10(14): 2766-2770 with Supporting Information (Year: 2014).*

Presser, et al., Carbide-Derived Carbons—From Porous Networks to Nanotubes and Graphene, Adv. Funct. Mater. 2011; 21: 810-833 (Year: 2011).*

Linares-Solano, et al., NaOH and KOH for Preparing Activated Carbons Used in Energy and Environmental Applications, International Journal of Energy, Environment and Economics 2012; 20(4): 59-91 (Year: 2012).*

Janghorban, et al., Effect of catyalyst and process parameters on the production of silicon carbide from rice hulls, Ceramics International 1999; 25: 7-12 (Year: 1999).*

\* cited by examiner

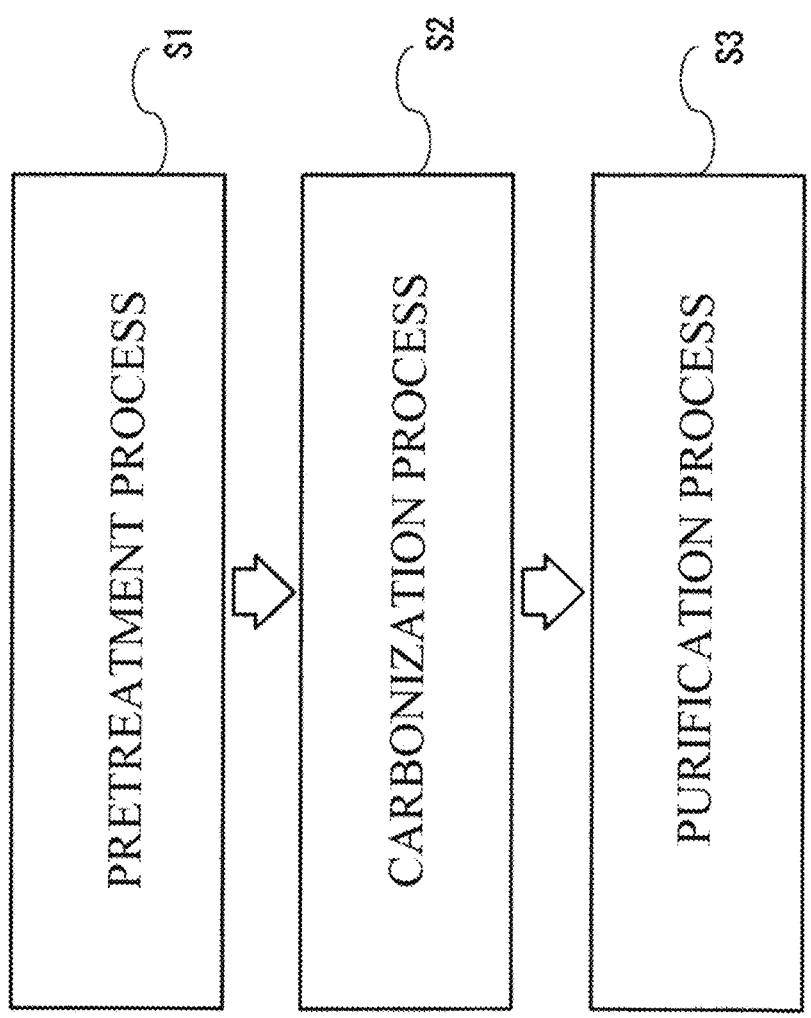
[FIG. 1]

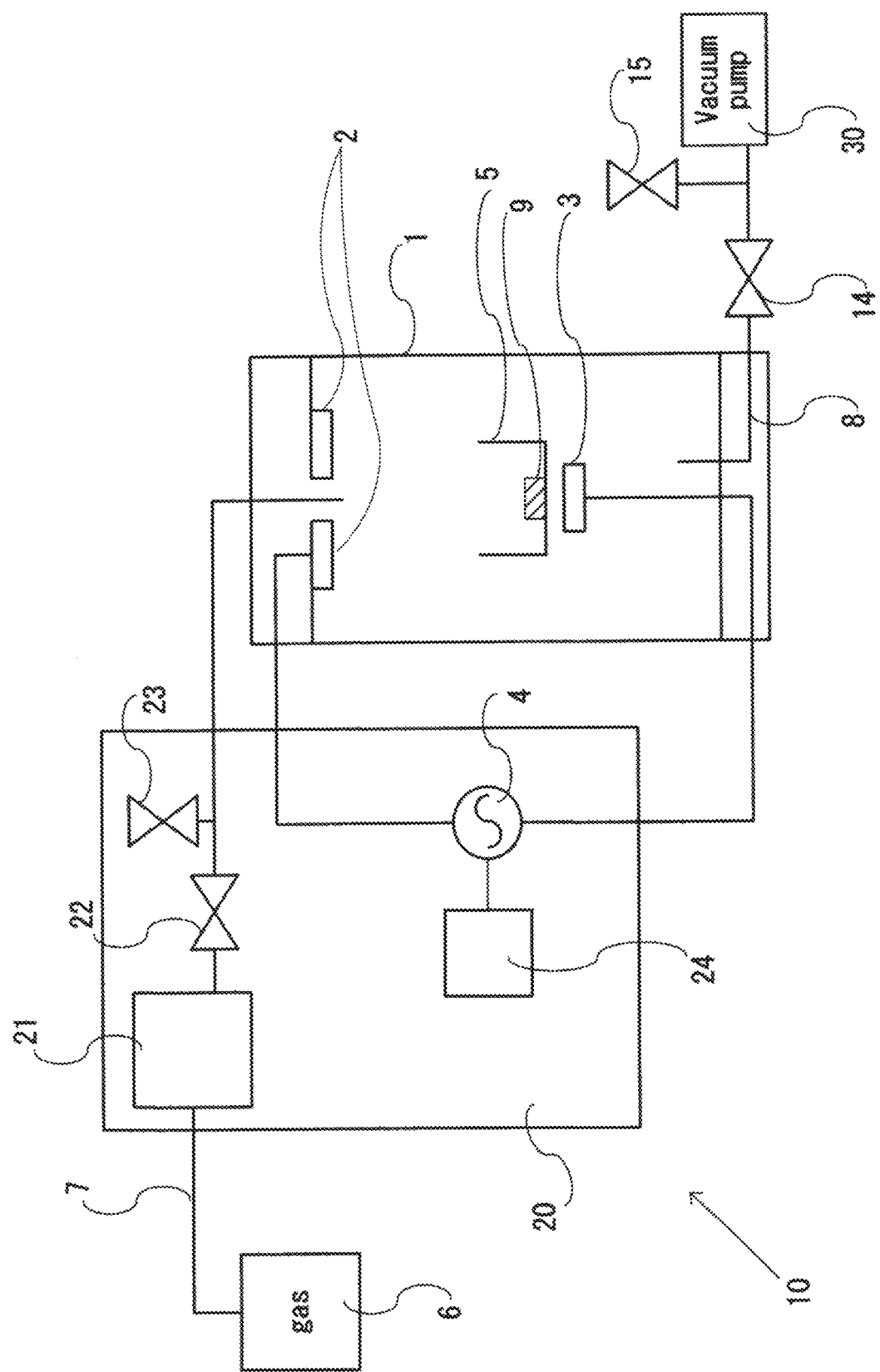
[FIG. 2]

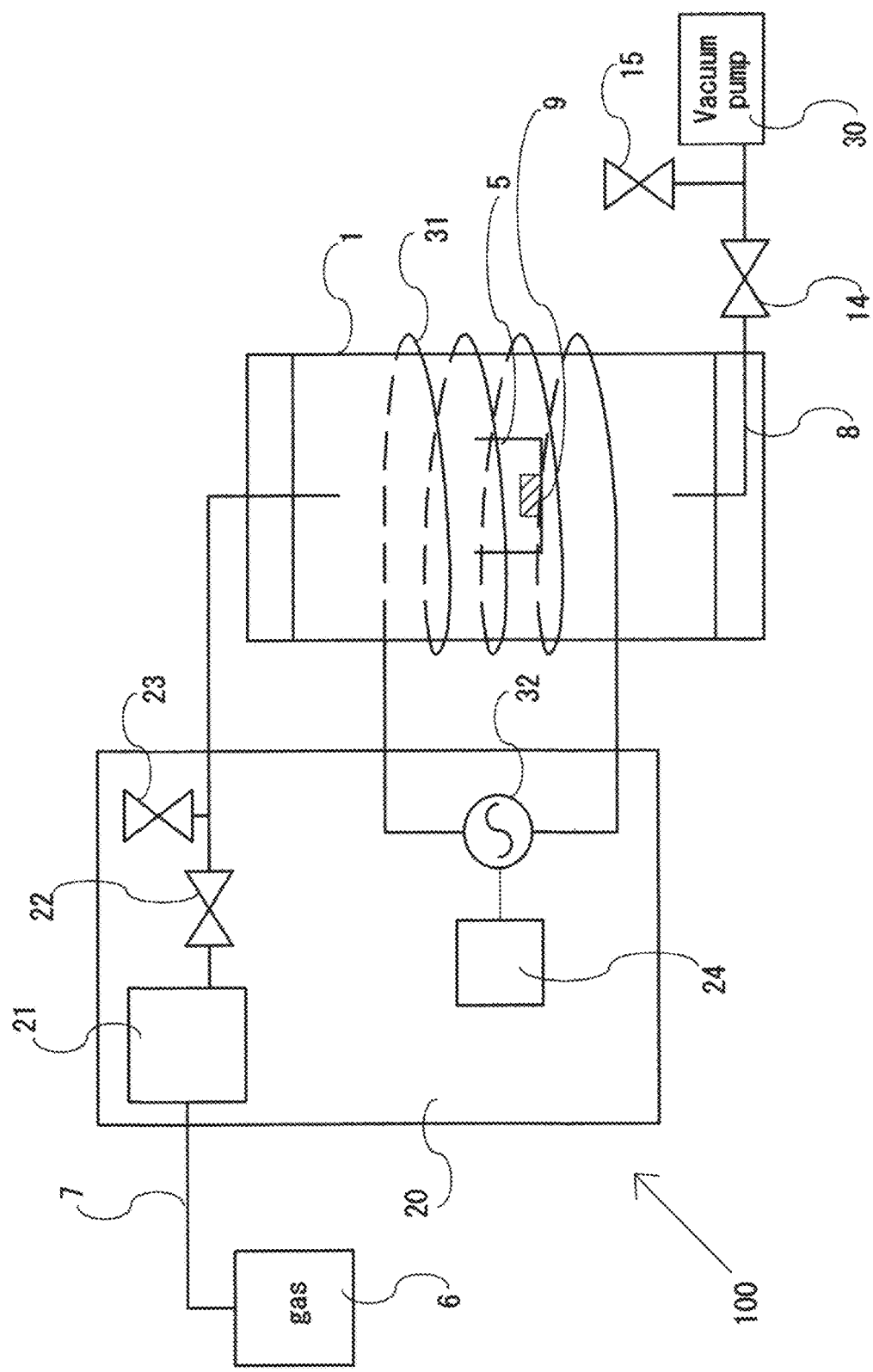
[FIG. 3]

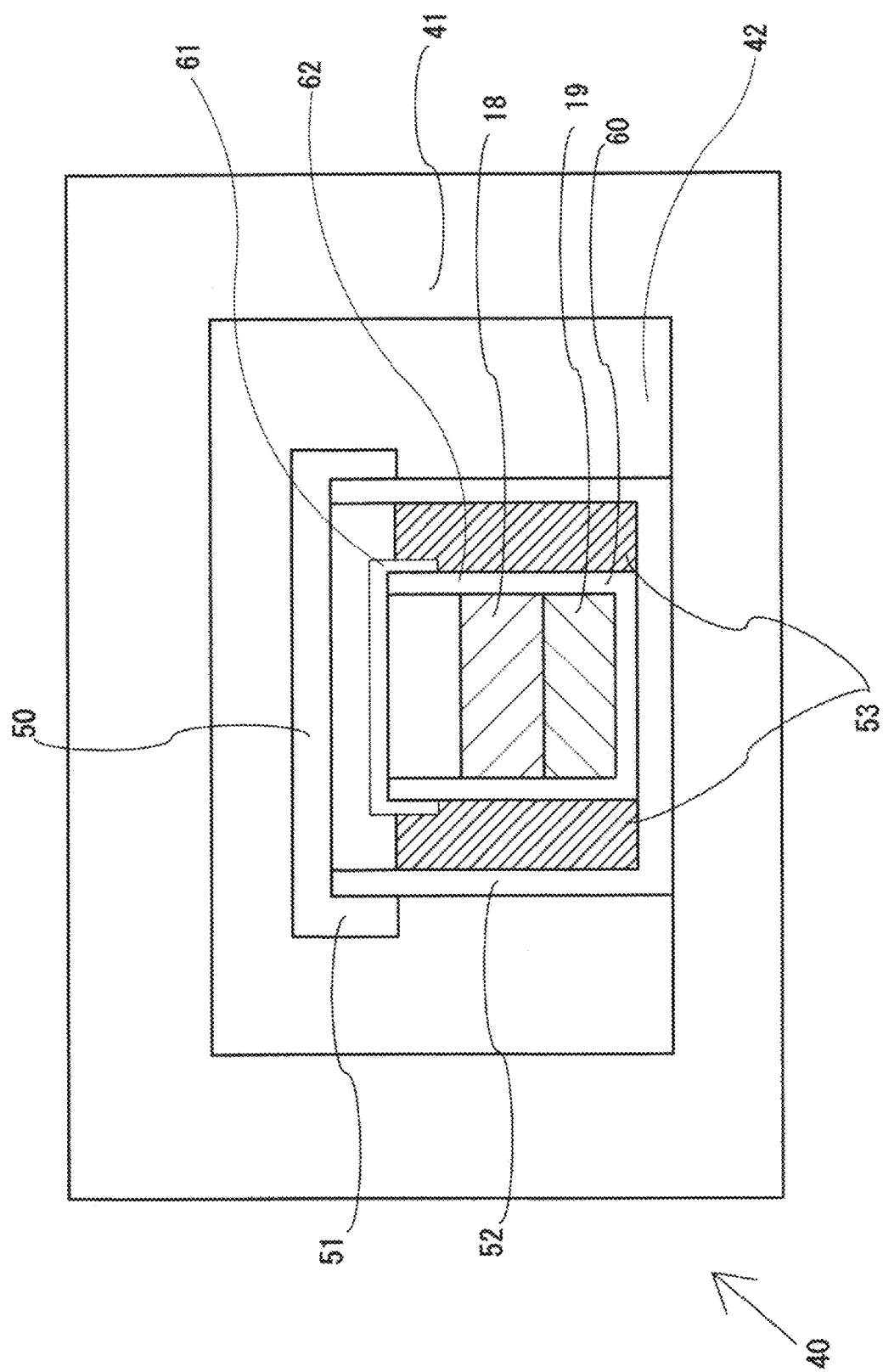
[FIG. 4]

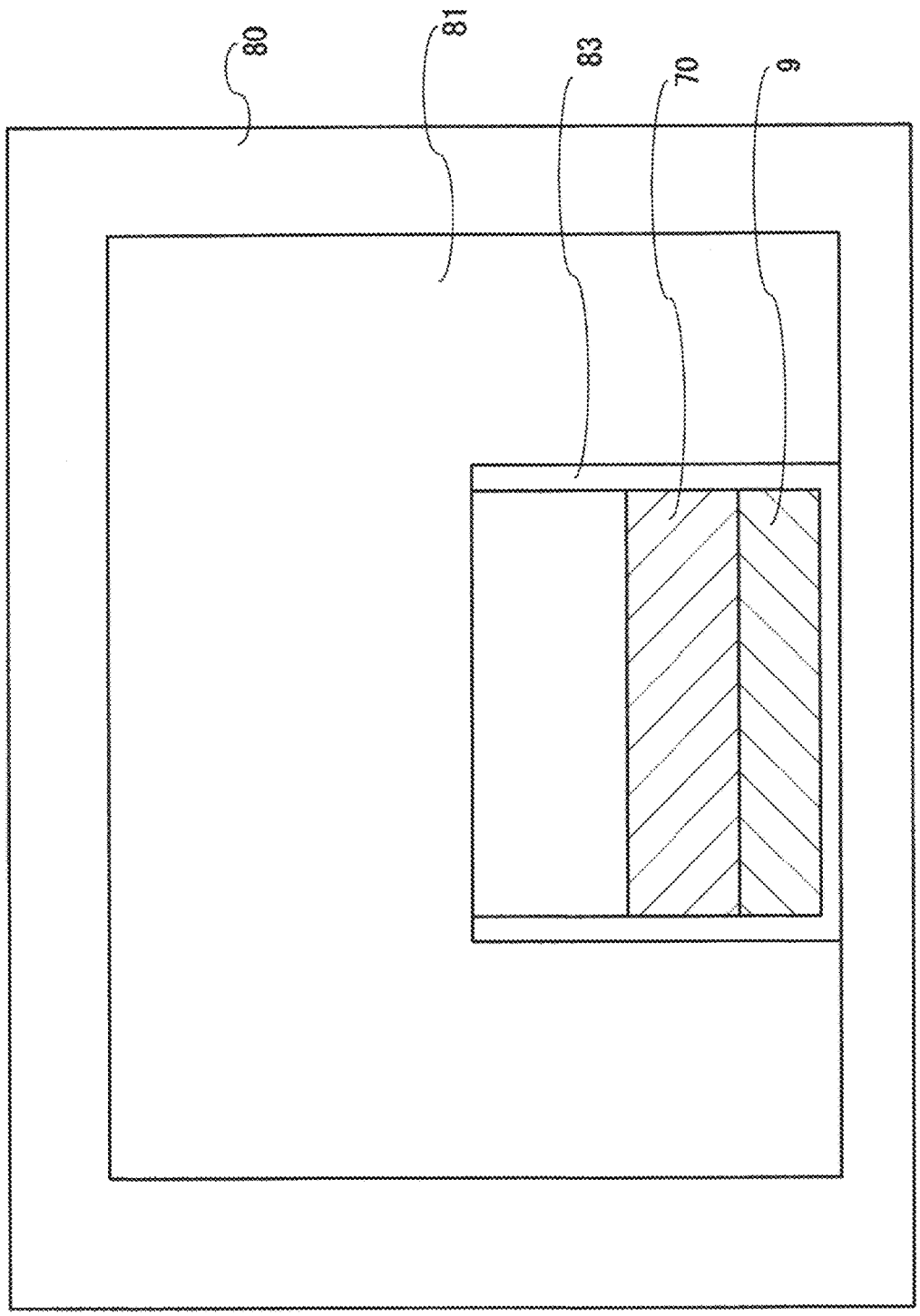
[FIG. 5]

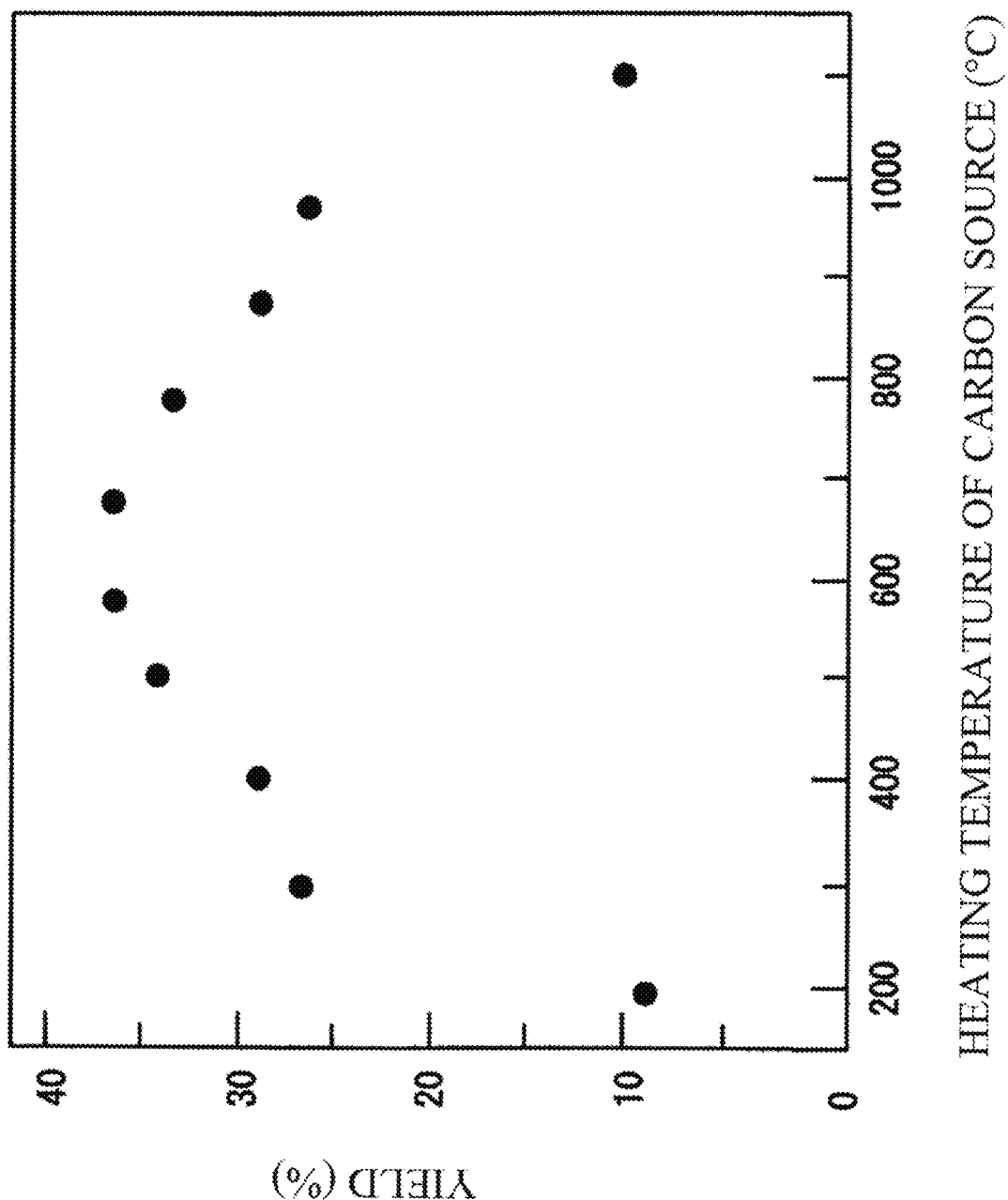
[FIG. 6]

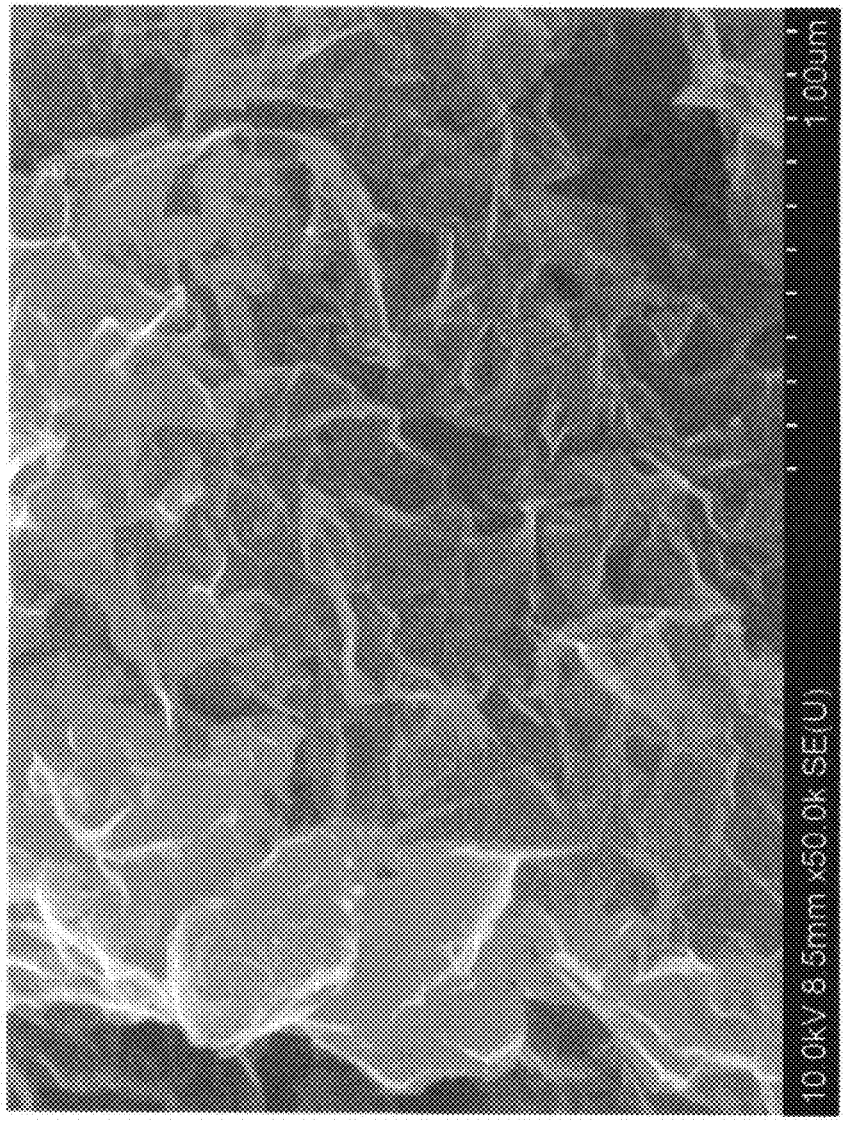
[FIG. 7]

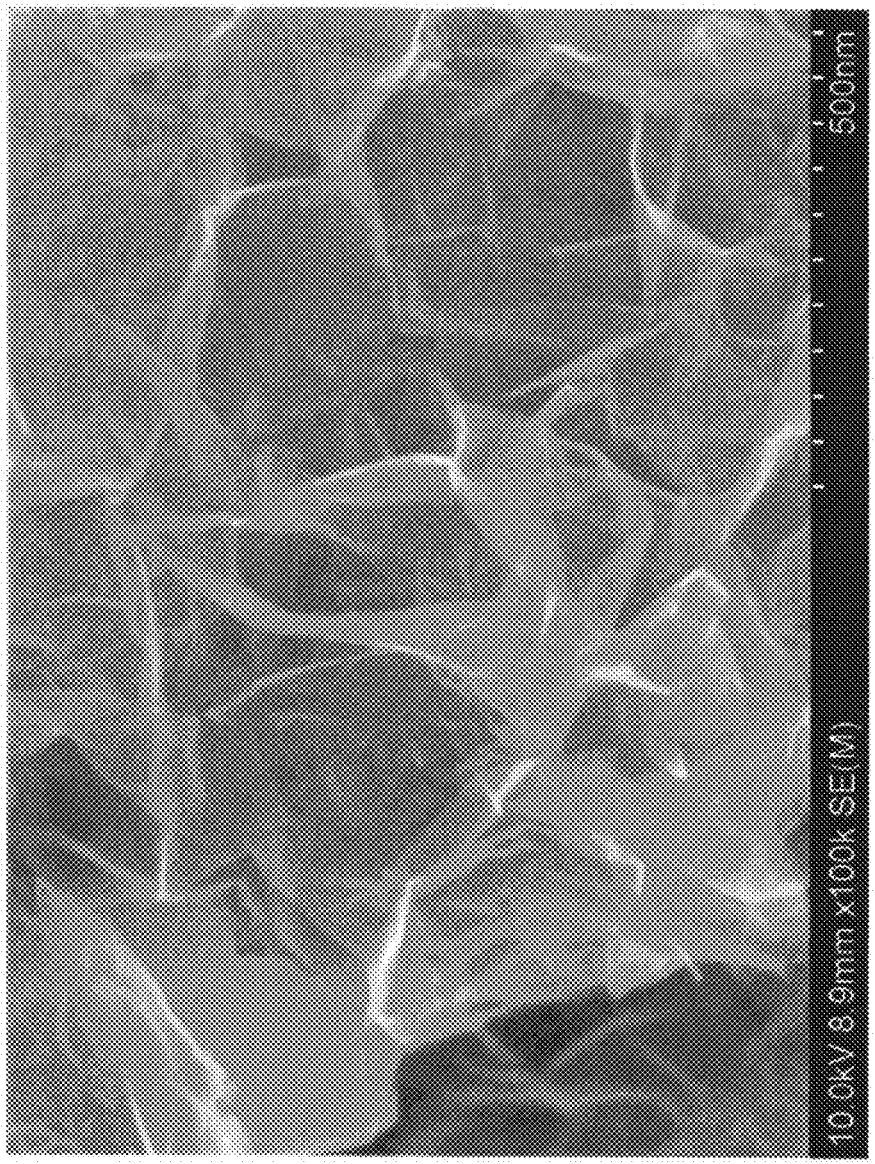
[FIG. 8]

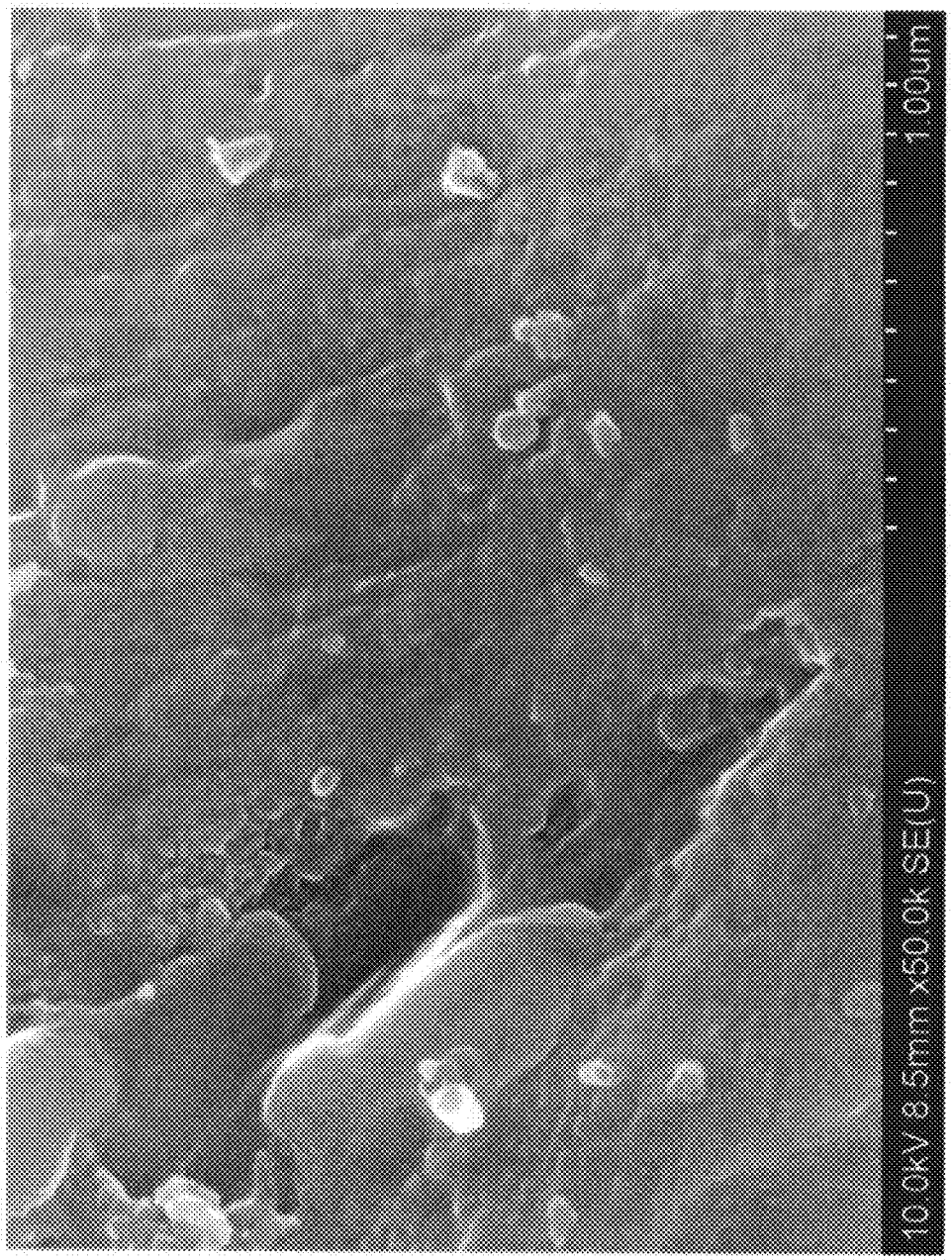
[FIG. 9]

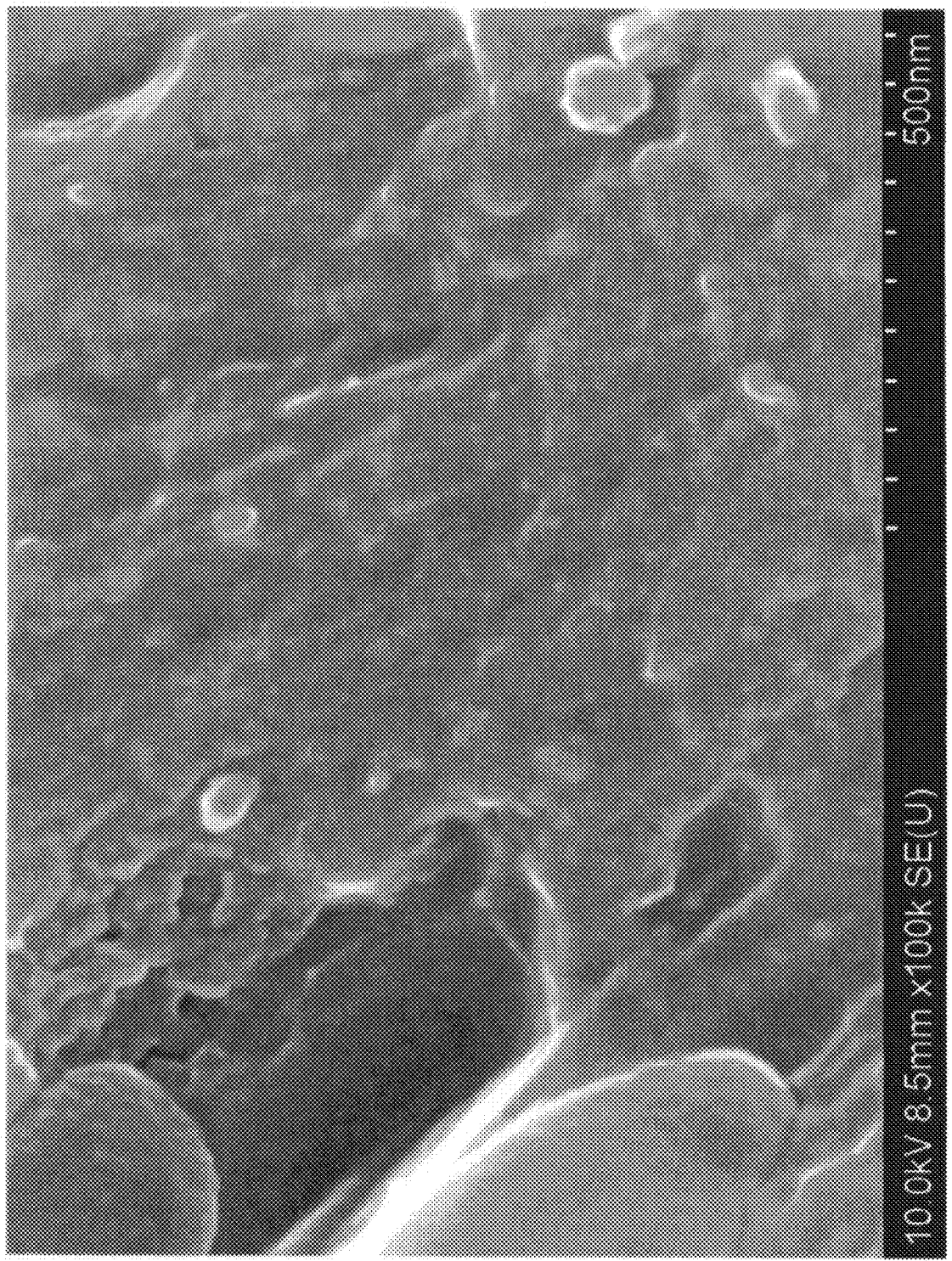
[FIG. 10]

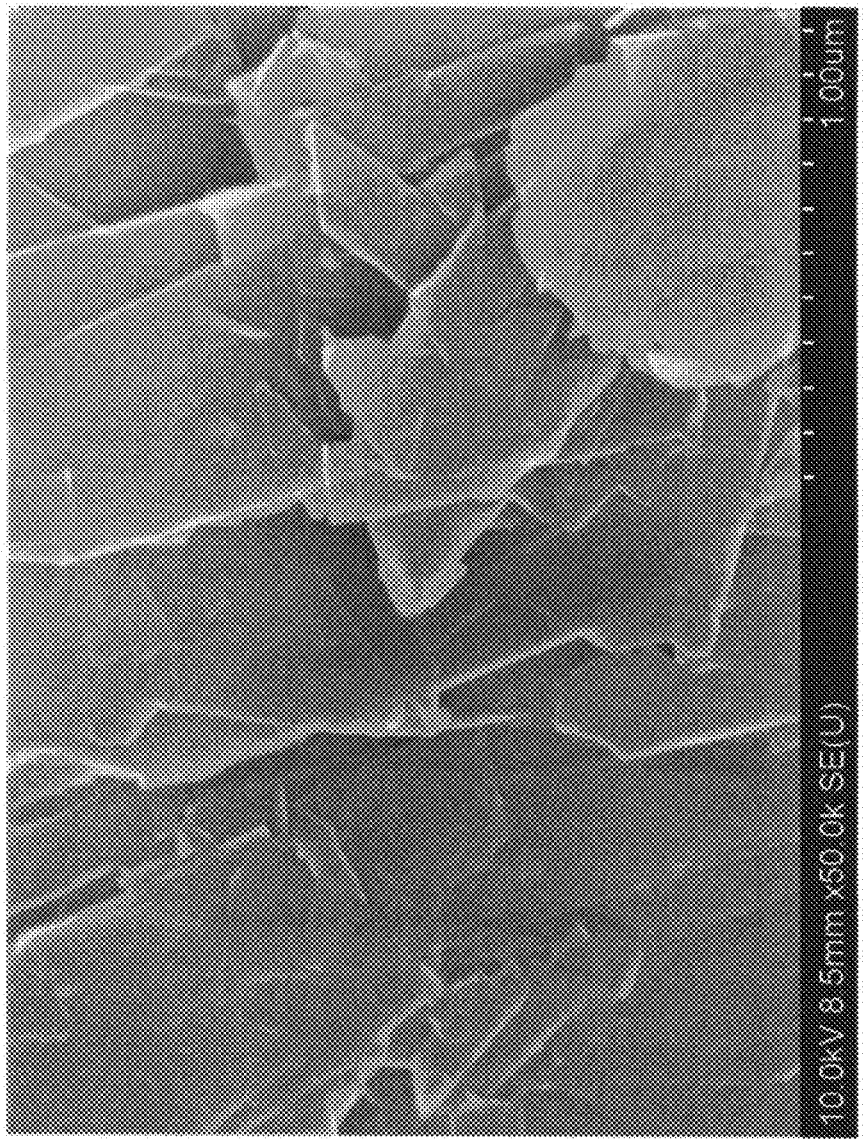
[FIG. 11]

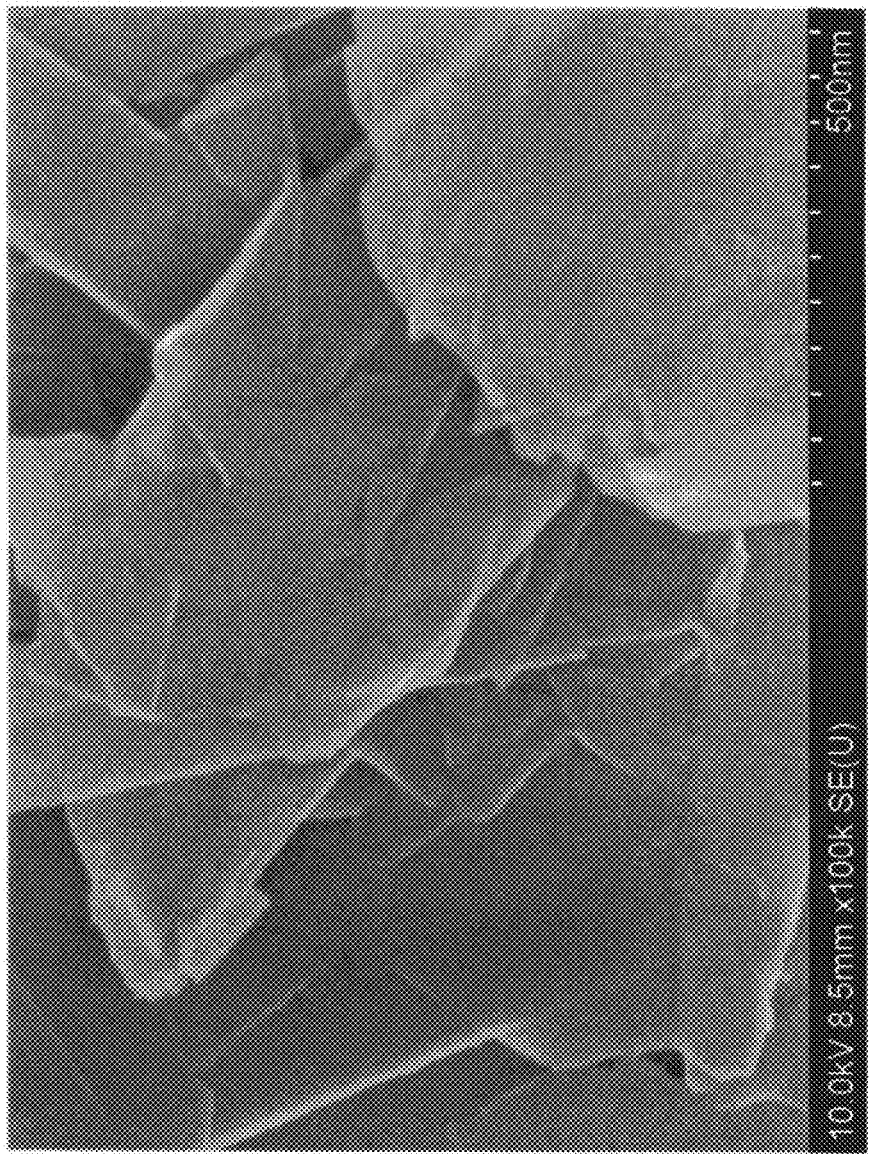
[FIG. 12]

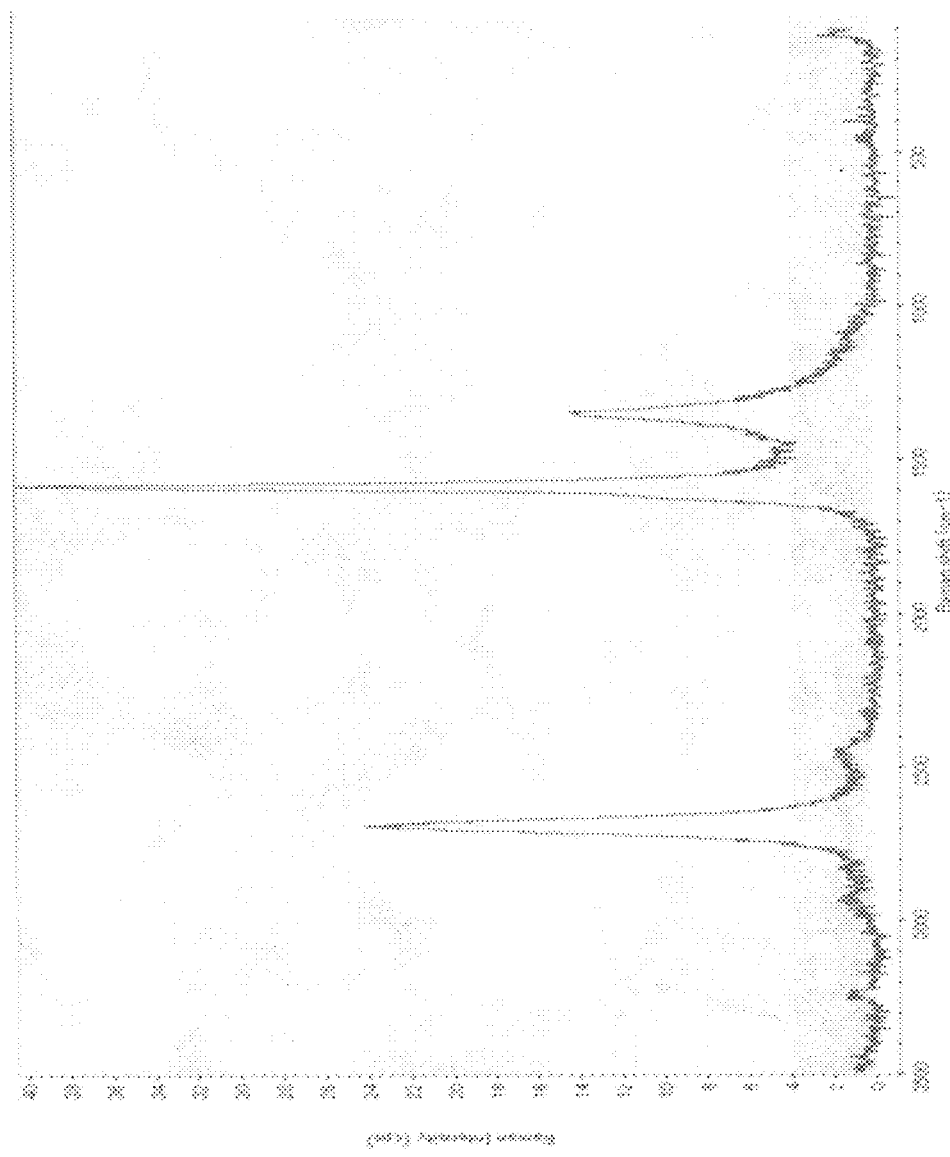
[FIG. 13]

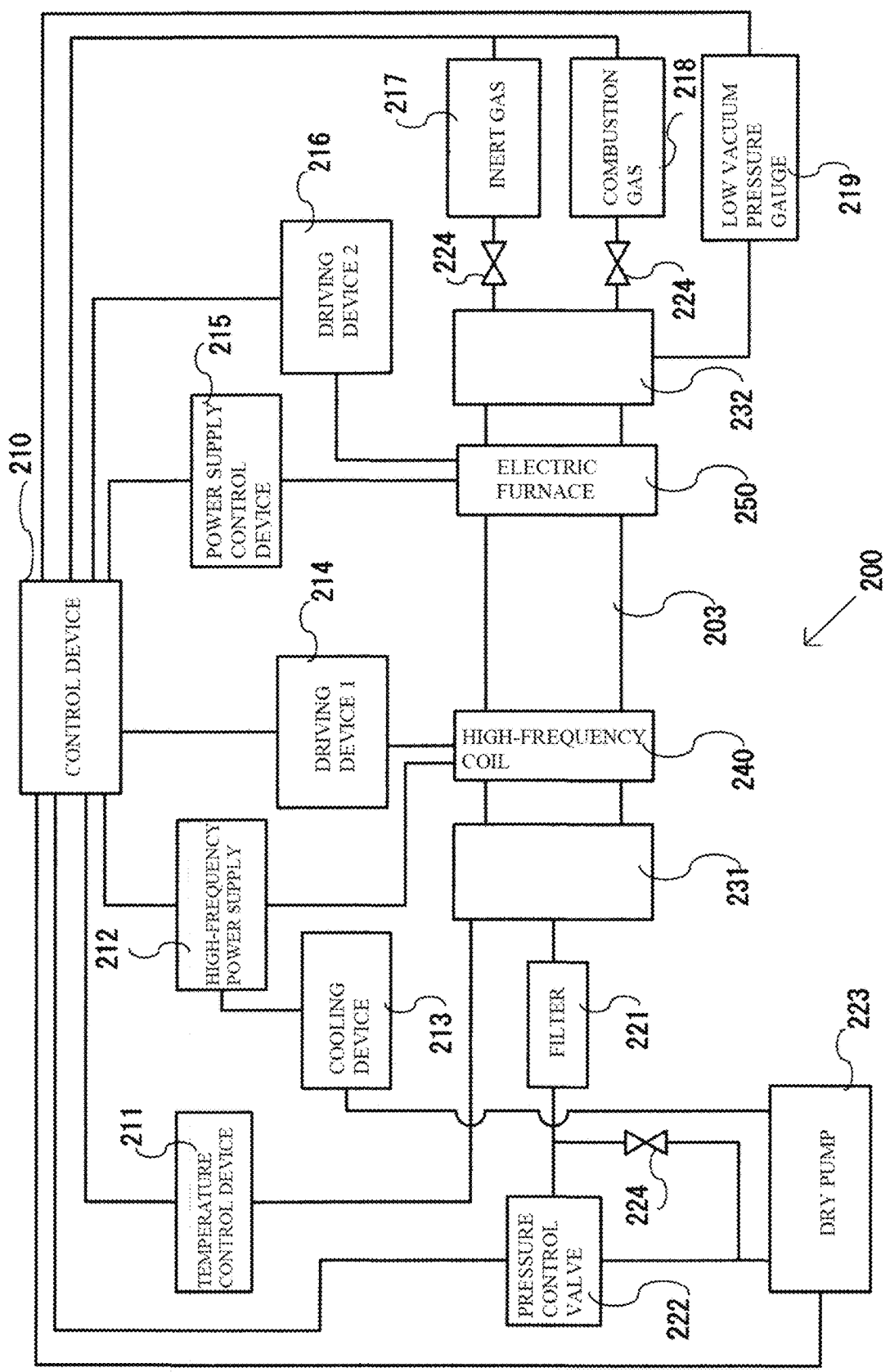
[FIG. 14]

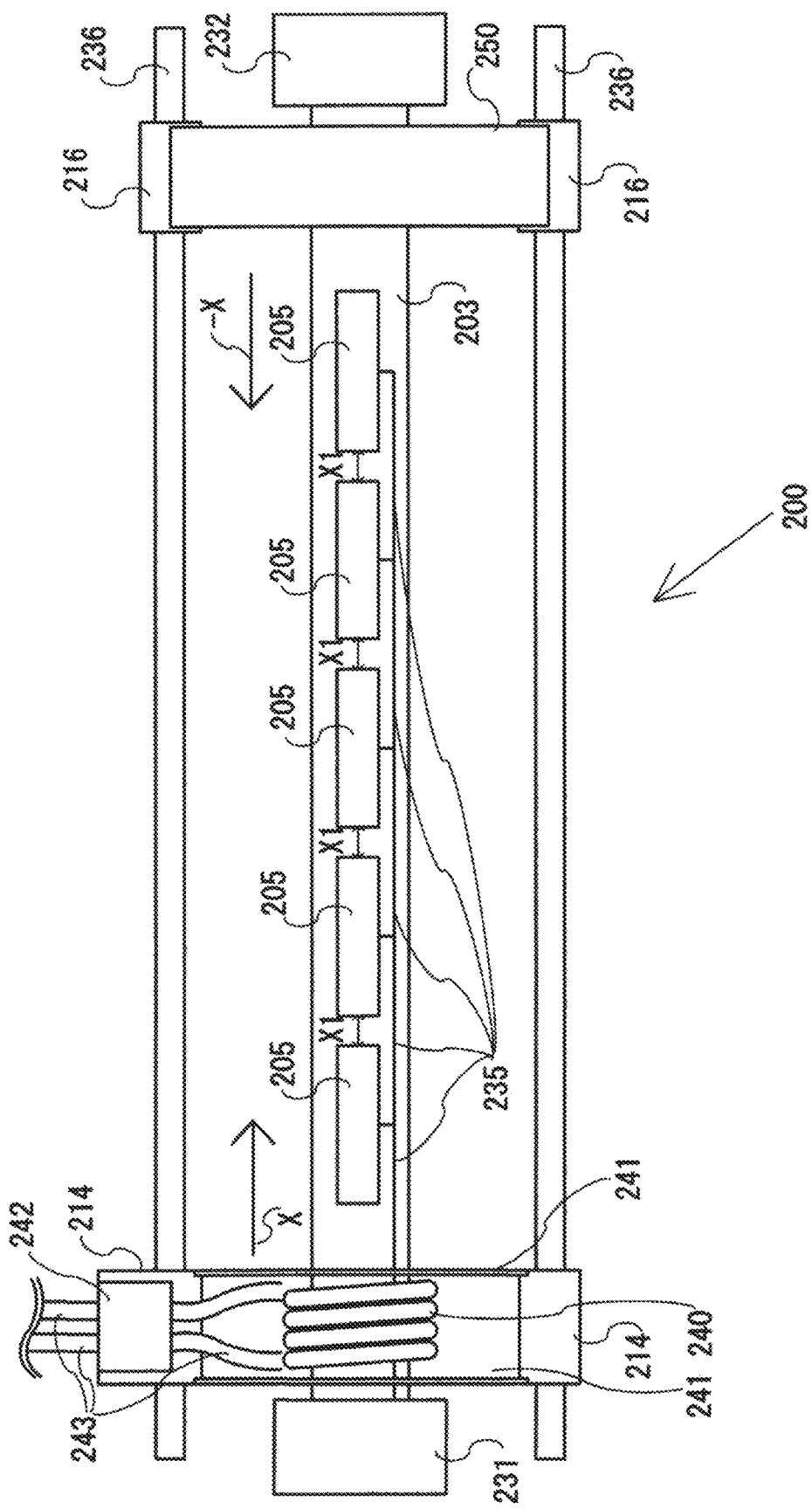
[FIG. 15]

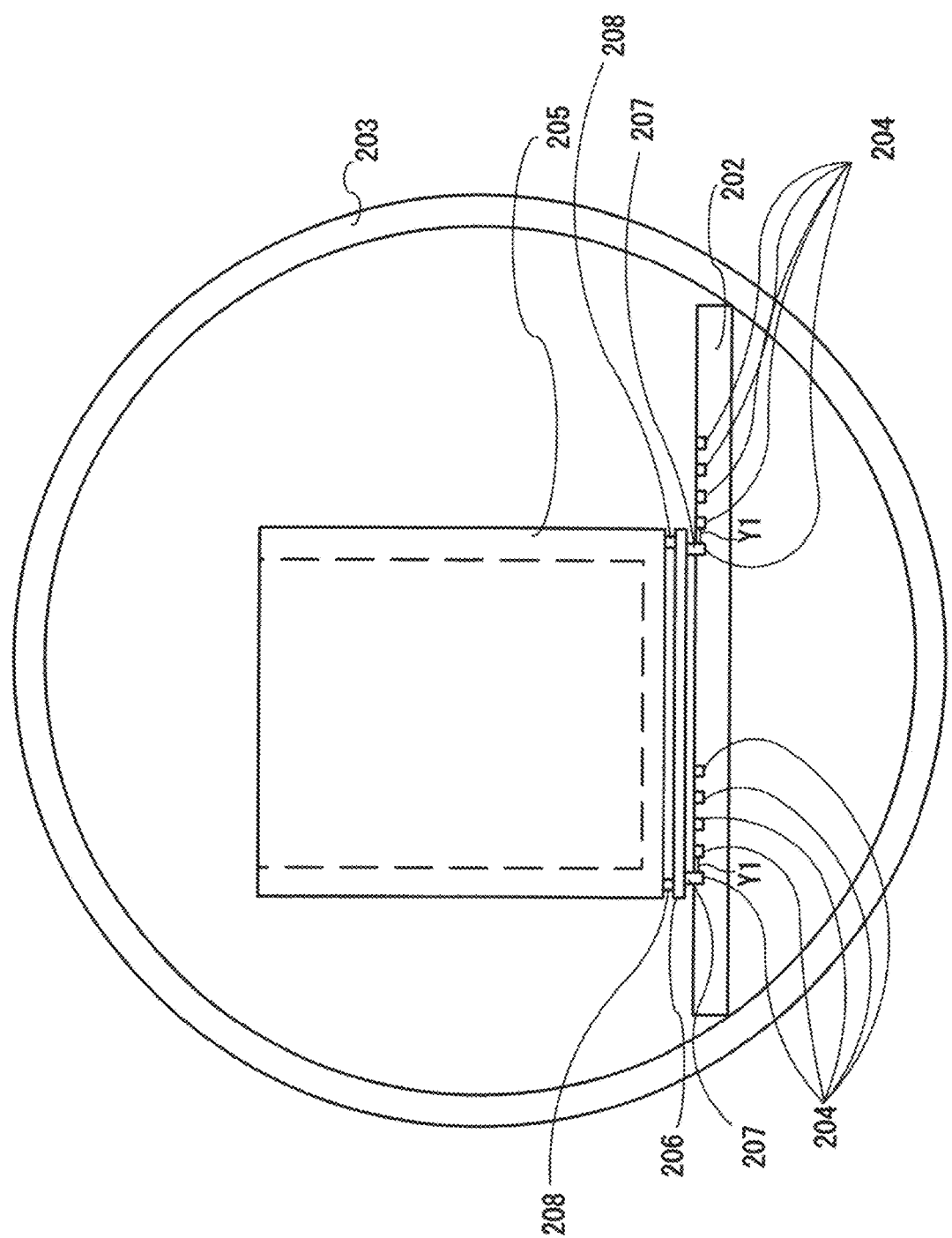
[FIG. 16]

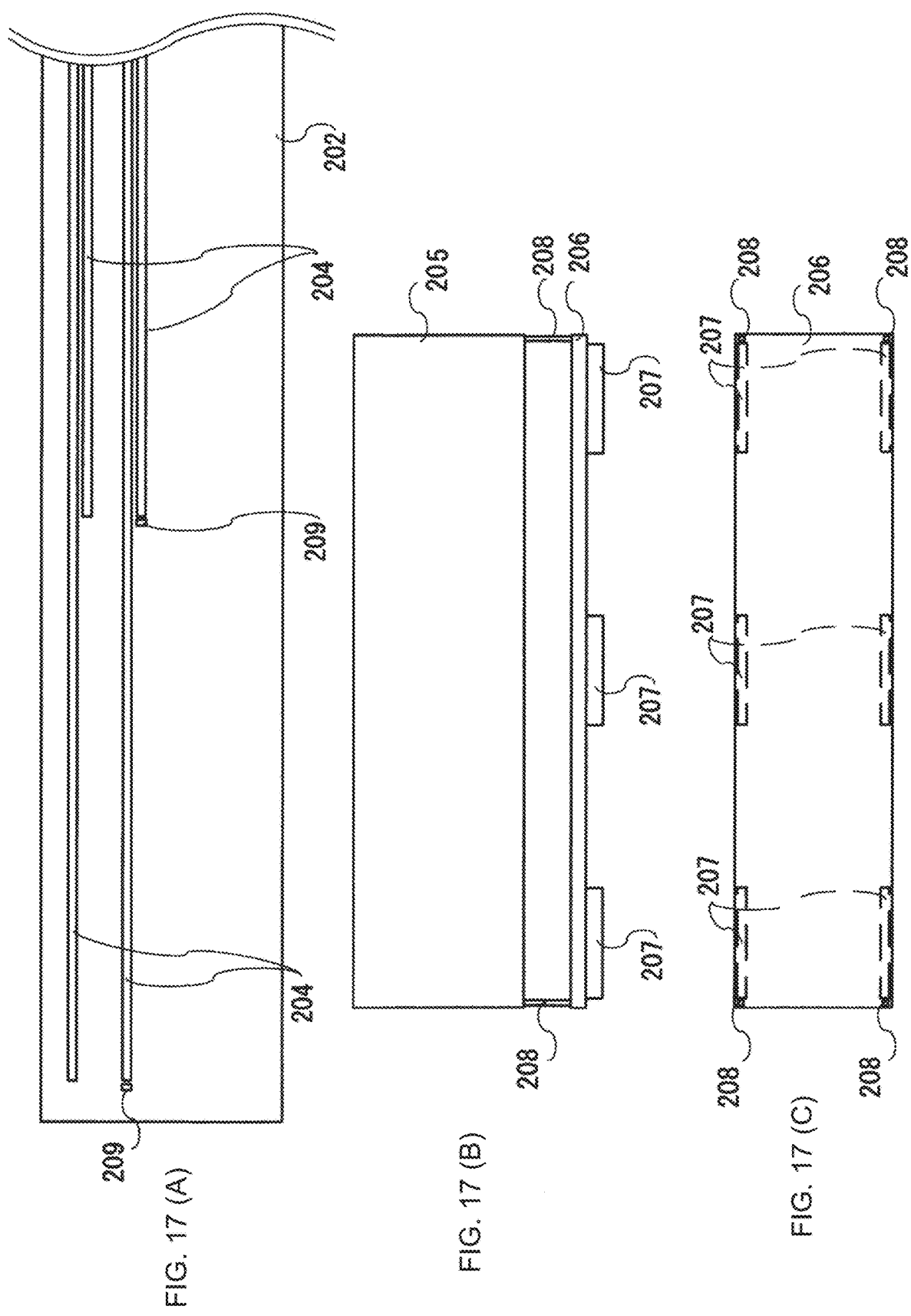

GRAPHENE, DEVICE FOR PRODUCING GRAPHENE, AND METHOD FOR PRODUCING GRAPHENE

BACKGROUND OF THE INVENTION (1) Field of the Invention

The present invention relates to a method for producing more graphene in a short period of time using a vegetable material as a carbon source and graphene produced by the method.

(2) Description of Related Art

Conventional examples of a method for producing nanocarbon include an arc discharge method, a laser evaporation method, and a chemical vapor deposition method (CVD method). Among them, single-phase carbon nanotubes are mass-produced by using a super-growth method which is one type of chemical vapor deposition method (CVD method) known as a mass production method.

For example, JP 2009-242180 A discloses an invention of a nanocarbon producing device including: a thermal decomposition liquid recovery unit configured to thermally decompose an organic matter material to be treated to recover a tar-mixed pyrolysis liquid; a pyrolysis-liquid tar content removing unit configured to remove a tar content from the recovered tar-mixed pyrolysis liquid; and a nanocarbon production unit configured to produce nanocarbon from the pyrolysis liquid from which the tar content has been removed. In the nanocarbon producing device, nanocarbon is produced from the organic matter material to be treated.

For example, JP 2010-042935 A discloses an invention of a nanocarbon producing device including: a rotary drum having a thermal decomposition chamber and a nanocarbon production chamber in a reducing atmosphere, partitioned by a partition plate having a through hole at the center portion thereof; a nanocarbon producing plate disposed in the nanocarbon production chamber; an electric heater disposed at the outer peripheral portion of the rotary drum; a raw material supply unit configured to supply biomass raw material or waste to the thermal decomposition chamber; and a scraping unit configured to scrape off nanocarbon produced on the nanocarbon producing plate. In the nanocarbon producing device, the biomass material or the waste is thermally decomposed in the thermal decomposition chamber and a pyrolysis gas containing hydrocarbons is delivered to the nanocarbon production chamber, the nanocarbon producing plate and the pyrolysis gas are brought into contact in the nanocarbon producing chamber in the reducing atmosphere to produce nanocarbon on the nanocarbon producing plate and to make the nanocarbon grow.

For example, WO 2013/058382 A discloses an invention of a method for producing a sintered body containing carbon nanohorns, the method including a sintering process of heating a preforming body containing carbon nanohorns produced by arc discharge in a fluid to a temperature of 1000° C. or higher and pressuring and sintering the preforming body.

Patent document 1: JP 2009-242180 A
Patent document 2: JP 2010-042935 A
Patent document 3: WO 2013/058382 A

SUMMARY OF THE INVENTION

There is a method for producing graphene from fossil raw material as disclosed WO 2013/058382 A. Meanwhile, from the viewpoint of reducing carbon dioxide, JP 2009-242180 A and JP 2010-042935 A enable production of graphene by using a biomass material without using a fossil raw material.

A biomass material is lower in cost than graphite and a hydrocarbon gas, and the raw material can be procured at low cost.

However, it is known that silica and the like are contained in a biomass material, and there are many problems regarding removal of the silica.

The present invention has been made to solve the above problems, and an object of the present invention is to provide a production method suitable for mass production of graphene which is raw material of nanocarbon and to provide highly pure graphene by using this production method.

A method for producing graphene includes:
a pretreatment process of drying and pulverizing a vegetable material to obtain a carbon source,
a carbonization process of carbonizing the carbon source to obtain a carbide; and
a purification process of removing an impurity containing silica from the carbide obtained in the carbonization process,
wherein the carbonization process including a heating process of supplying an inert gas into a chamber and heating the carbon source in the chamber in a plasma atmosphere.

According to the above characteristics, the present invention is capable of producing a large amount of graphene inexpensively and efficiently in a short time, and enables production of highly pure graphene.

BRIEF DESCRIPTION OF THE DRAWINGS

FIG. 1 is a diagram illustrating a process flow depicting production processes according to an embodiment:

FIG. 2 is a schematic view illustrating a configuration of a plasma device according to the embodiment;

FIG. 3 is a schematic view illustrating a configuration of a plasma device of another aspect of the embodiment;

FIG. 4 is a schematic diagram illustrating a configuration of an impurity removing device according to the embodiment:

FIG. 5 is a schematic view illustrating a configuration of a carbonizing furnace device according to the embodiment;

FIG. 6 is a graph illustrating relationship between the temperature of a carbon source and the theoretical yield of a carbide in the production process according to the embodiment;

FIG. 7 is an electron micrograph of a carbide obtained by a producing device of the present invention;

FIG. 8 is an electron micrograph of the carbide obtained by the producing device of the present invention;

FIG. 9 is an electron micrograph of a carbide obtained by the producing device of the present invention;

FIG. 10 is an electron micrograph of the carbide obtained by the producing device of the present invention;

FIG. 11 is a SEM image of graphene produced from a mineral;

FIG. 12 is a SEM image of the graphene produced from the mineral;

FIG. 13 is a Raman spectrum of the final product obtained by the producing device of the present invention:

FIG. 14 is a block diagram illustrating a configuration of a carbide producing device according to an embodiment:

FIG. 15 is a schematic view illustrating a configuration of the carbide producing device according to the embodiment;

FIG. 16 is a cross-sectional view illustrating part of the carbide producing device according to the embodiment; and FIGS. 17A to 17C are schematic views each illustrating part of the carbide producing device according to the embodiment.

DETAILED DESCRIPTION OF PREFERRED EMBODIMENTS

A method for producing graphene and the graphene produced from the method according to the present invention will be described in detail with reference to the drawings. Note that embodiments and drawings to be described below are examples of part of the embodiments of the present invention, are not intended to limit the present invention to these configurations, and can be appropriately modified within a range not deviating from the gist of the present invention.

Biomass Material

A vegetable material which is a biomass raw material for producing graphene according to first to six embodiments will be described. In the present invention, graphene which is a final product is produced by using the vegetable material which is food residue or a vegetable material to be discarded. Plants, lumber, or the like is used as the vegetable material. However, if a vegetable material to be discarded such as residues generated when plants are harvested is used as raw material for producing graphene, it is possible to obtain raw material at low cost.

narrow cell line between silicided cell lines and it is possible to obtain carbon material having a great specific surface area by removing silicon or the like after carbonization. As described above, the vegetable material containing a large amount of, that is, 13% or more and 35% or less of silicic acid is suitable. If the amount of silicic acid is too great, the amount of graphene to be obtained decreases. Therefore, the vegetable material containing silicic acid in the range of about 20% is preferable. Alternatively, the vegetable material contains 13% or more and 35% or less of silicon.

Table 1 illustrates examples of the vegetable material which contains a relatively large amount of carbon. The examples include, in addition to rice straw, wheat straw, barley straw, rice bran, chaff, buckwheat straw, soybean straw, sweet potato vine, a turnip leaf, a carrot leaf, a corn culm, a sugar cane crown, a palm cake, a peanut shell, mandarin orange peel, red cedar sawdust, bark of larch, and a fallen leaf of ginkgo. In addition, a plant itself rather than the residue thereof may be used.

For example, bamboo contains fiber material made of cellulose, hemicellulose, lignin, and minerals such as iron, magnesium, calcium, manganese, copper, and nickel. In addition, when a bamboo leaf is fired, a silanol group (Si—OH) is extracted and is converted into $SiO_4$, and $SiO_4$ is extracted in the process of firing.

TABLE 1

| Composition table of vegetable materials | C | N | P | $P_2O_5$ | K | $K_2O$ | Ca | Mg | Na |
|---|---|---|---|---|---|---|---|---|---|
| Rice straw | 37.4 | 0.53 | 0.06 | 0.14 | 1.75 | 2.11 | 0.05 | 0.19 | 0.11 |
| Wheat straw | 40.3 | 0.67 | 0.08 | 0.18 | 1 | 1.21 | 0.21 | 0.11 | 0.06 |
| Barley straw | 41.8 | 0.58 | 0.08 | 0.18 | 1.4 | 1.69 | 0.29 | 0.1 | — |
| Rice bran | 40.2 | 1.18 | 0.9 | 2.06 | 1.1 | 1.33 | 0.01 | 0.7 | 0.07 |
| Chaff | 34.6 | 0.32 | 0.03 | 0.05 | 0.31 | 0.37 | 0.01 | 0.07 | 0.13 |
| Buckwheat straw | 40.3 | 1.08 | 0.21 | 0.48 | 3.13 | 3.77 | 1.35 | 0.14 | — |
| Soybean straw | 44.5 | 1.23 | 0.12 | 0.28 | 0.75 | 0.9 | 1.39 | 0.64 | 0.2 |
| Sweet potato vine | 42.7 | 3.74 | 0.22 | 0.5 | 3 | 3.62 | 1 | 0.17 | 0.12 |
| Turnip leaf | 39.8 | 3.33 | 0.27 | 0.62 | 4.35 | 5.24 | 1.7 | 0.8 | 0.49 |
| Carrot leaf | 41.4 | 2.63 | 0.25 | 0.57 | 4.2 | 5.06 | 0.56 | 0.19 | 0.51 |
| Corn culm | 43.8 | 0.92 | 0.09 | 0.21 | 1.32 | 1.59 | 0.24 | 0.12 | — |
| Sugar cane crown | 46.1 | 0.99 | 0.1 | 0.23 | 1.2 | 1.45 | 0.37 | 0.12 | 0.18 |
| Palm cake | 46.2 | 3.86 | 0.69 | 1.58 | 2.69 | 3.24 | 0.21 | 0.3 | 0.04 |
| Peanut shell | 51.1 | 0.75 | 0.02 | 0.06 | 0.47 | 0.57 | 0.17 | 0.05 | 0.05 |
| Mandarin orange peel | 44.5 | 0.76 | 0.05 | 0.11 | 0.58 | 0.7 | 0.4 | 0.06 | 0.07 |
| Red cedar sawdust | 51.1 | 0.07 | — | — | — | — | — | — | — |
| Bark of larch | 59.6 | 0.06 | — | — | — | — | — | — | — |
| Fallen leaf of ginkgo | 50.3 | 0.71 | 0.06 | 0.15 | 0.29 | 0.35 | 1.5 | 0.23 | 0.06 |

Table 1 is a composition table of the vegetable materials. In Table 1, ratios of the components constituting the raw material indicated in the leftmost column are indicated in percentage in the subsequent right columns. For example, rice straw contains 37.4% carbon (C), 0.53% nitrogen (N), 0.06% phosphorus (P), 0.14% phosphoric acid ($P_2O_5$), 1.75% potassium (K), 2.11% potassium oxide ($K_2O$), 0.05% calcium (Ca), 0.19% magnesium (Mg), and 0.11% sodium (Na).

Here, a plant-derived silicon-containing porous vegetable material does not substantially change even if the material is carbonized at a low temperature (300° C. or higher and 1000° C. or lower), and arrangement of pores can be maintained by removing silicon. Many of the vegetable materials have a structure in which cells are regularly arranged along the axis and silicic acid is deposited on the cell walls to thicken the cell walls. There is a compressed

TABLE 2

Composition table of vegetable material

| Water content | Ash content | Lipid | Lignin | Hemi-cellulose | Cellulose | Others |
|---|---|---|---|---|---|---|
| 8~10% | 15~18% | 0.1~0.5% | 18~25% | 16~20% | 30~35% | 5~10% |

TABLE 3

Chemical composition table (wt %) of inorganic matter of vegetable material

| $SiO_2$ | $Al_2O_3$ | CaO | $Fe_2O_3$ | $K_2O$ | MgO | MnO | $Na_2O$ |
|---|---|---|---|---|---|---|---|
| 92.14 | 0.04 | 0.48 | 0.03 | 3.2 | 0.16 | 0.18 | 0.09 |

Tables 2 and 3 are composition tables of the vegetable material most suitable for the method of producing amorphous silica or graphene, from among carbon sources 9 which are the vegetable materials in Table 1 described above in the present invention. Table 2 illustrates ratios of the components constituting the raw material indicated in percentage. For example, water content is 8% to 10%, ash content is 15% to 18%, lipid is 0.1% to 0.5%, lignin is 18% to 25%, hemicellulose is 16% to 20%, cellulose is 30% to 35%, and others are 5% to 10%. As described above, main components which become silica ash are lignin, hemicellulose, and cellulose.

Table 3 illustrates chemical composition of the inorganic matter of the carbon source 9 which is the vegetable material illustrated in Table 2. In the carbon source 9 which is the vegetable material illustrated in Table 2, the organic matter such as cellulose is 80 wt %, and the inorganic matter is 20 wt %. The chemical composition of the inorganic matter of Table 3 is as follows: $SiO_2$ is 92.14 wt %, $Al_2O_3$ is 0.04 wt %, CaO is 0.48 wt %, $Fe_2O_3$ is 0.03 wt %, $K_2O$ is 3.2 wt %, MgO is 0.16 wt %, MnO is 0.18 wt %, and $Na_2O$ is 0.09 wt %. The carbon source 9 which is the vegetable material illustrated in Table 2 contains a large amount of silicon oxide ($SiO_2$) as inorganic matter.

Graphene

FIGS. 7 to 10 illustrate graphene which is a carbide 19 obtained in a carbonization process 52, produced according to the first to sixth embodiments. FIG. 7 is an electron micrograph of 50,000 times magnification of graphene A containing 14 wt % of silicon (Si) which is the carbide 19 obtained in the carbonization process S2. FIG. 8 is an electron micrograph of 100,000 times magnification of graphene A which is the carbide 19 obtained in the carbonization process S2. FIG. 9 is an electron micrograph of 50,000 times magnification of graphene B containing 24 wt % of silicon (Si) which is the carbide 19 obtained in the carbonization process S2. FIG. 10 is an electron micrograph of 100,000 times magnification of graphene B which is the carbide 19 obtained in the carbonization process S2.

It is considered that graphene obtained in the carbonization process S2 without being subjected to a purification process S3 to be described later contains a large amount of silicon as illustrated in FIGS. 9 and 10 and is not strongly reduced and becomes $SiO_2$-x in a case where the graphene is carbonized in an inert gas, and $SiO_2$-x binds to an aromatic —OH group or the like in the form of —O—Si—O—R, becomes a lignin polysaccharide complex, and is likely to be in the form of C/SiO x.

Therefore, in a case where the carbide 19 obtained in the carbonization process S2 is used as a negative electrode material of a battery material, there is an effect of improving the cycle capacity.

In addition, as illustrated in FIG. 7 or 8, it can be confirmed that the carbide 19 is formed with fine pores of a single layer nano-level. Therefore, it is considered that the carbide 19 easily adsorb metal ions and the like.

In addition, in the carbide 19 illustrated in FIG. 7 or 8, nano-level pores are formed in the growth process of forming a skeleton. Due to these pores, when the carbide 19 is used especially for a capacitor, a battery, or the like, the energy density is more than doubled. Therefore, electric conduction performance is also improved.

FIG. 11 is an electron micrograph of 50,000 times magnification of graphene C produced from a mineral by using a conventional method. FIG. 12 is an electron micrograph of 100,000 times magnification of graphene C produced from the mineral by using the conventional method. FIG. 13 is a Raman spectrum of graphene which is the final product obtained by the producing device of the present invention. Here, the scale of the electron microscopic photograph is in increments of 10. One graduation indicates 50 nm in the electron micrograph of 100,000 times magnification. One graduation indicates 0.1 μm in the electron micrograph of 50,000 times magnification.

Graphene is a sheet-like monatomic film in which carbon atoms are π bonded with sp2 hybrid orbitals and are arranged in a hexagonal shape on one plane. It can be confirmed that graphene C illustrated FIGS. 11 and 12, produced from the mineral is multilayered while graphene A, B illustrated in FIGS. 7 to 10 and 13, produced in the present invention, is single layered and is extremely highly pure graphene. In addition, many nano-level pores are observed.

FIG. 13 is a Raman spectrum of a signal obtained by analyzing graphene obtained by using the producing device according to the present invention with a Raman spectroscopic device. The horizontal axis represents wavelength (wave number) and the vertical axis represents intensity.

First Embodiment

Plasma Device 1

A plasma device 10 according to the present embodiment will be described with reference to FIG. 2. FIG. 2 is a schematic view illustrating a configuration of the plasma device 10 according to the present embodiment. The plasma device 10 mainly includes an inert gas 6, a control device 20, a chamber 1, and a vacuum pump 30.

Argon was mainly used as the inert gas 6 contained in a gas cylinder; however, examples of the inert gas 6 include helium, neon, and nitrogen. The inert gas 6 can be filled into the chamber 1 from an introduction pipe 7 via a gas amount control device 21. The gas amount control device 21 is capable of adjusting the flow rate of the inert gas 6.

The chamber 1 is connected to a control valve 22, and the inside of the chamber 1 can be depressurized to a vacuum state by the vacuum pump 30. The introduction pipe 7 is connected to the chamber 1 to introduce the inert gas 6 into the chamber 1. A leak valve 23 for releasing the vacuum state in the chamber 1 to atmospheric pressure is provided between the control valve 22 and the chamber 1. A control valve 14 and a leak valve 15 for releasing the vacuum state in the chamber 1 to the atmospheric pressure are also provided between a lead-out pipe 8 for introducing the air in the chamber 1 and the vacuum pump 30.

In addition, a temperature control device 24 controls a high-frequency power supply 4 so as to manage temperature retention and temperature retention time, and the like inside the chamber 1. The plasma device 10 of the present embodiment adopts a method of filling, as a working gas, argon gas which is the inert gas 6 under low pressure close to the vacuum state, and making a high current flow between a cathode 2 and an anode 3 which are electrodes, and obtaining thermal plasma produced by arc discharge. A crucible 5 made of carbon is disposed between the cathode 2 and the anode 3, and the carbon source 9 described later is put in the crucible 5. By heating the carbon source 9 in a temperature range from 300° C. to 1000° C. by thermal plasma produced by arc discharge, the carbon source 9 is carbonized in about 10 to 30 minutes.

Second Embodiment

Plasma Device 2

A plasma device 100 according to a second embodiment will be described with reference to FIG. 3. In FIG. 3, the same reference numerals are given to portions representing the same configurations as those of the plasma device 10, and the portions having the same configuration will not be described. The plasma device 100 mainly includes an inert gas 6, a control device 20, a chamber 1, and a vacuum pump 30. A main point of difference from the plasma device 10 is that in a method for producing thermal plasma, the inert gas 6 for plasma is made to flow, a high-frequency magnetic field of 4 MHz is applied from a high-frequency power supply 32 to a high-frequency coil 31 to produce thermal plasma. By heating the carbon source 9 in a temperature range from 300° C. to 1000° C. by thermal plasma, the carbon source 9 is carbonized in about 10 to 30 minutes.

By using the plasma device 10, 100 as described above, even lignin which is difficult to be thermally decomposed can be decomposed.

Note that besides the plasma device described above, there is a method of producing thermal plasma by a plasma device using barrier discharge, corona discharge, pulse discharge, and DC discharge.

Impurity Removing Device

FIG. 4 illustrates an example of an impurity removing device 40 which removes impurities such as silicon oxide (silicon) from the carbide 19 obtained by carbonizing the carbon source 9 by the above-described plasma device 10, 100.

In a heating furnace 41, a furnace 42 can be heated to a high temperature close to 2000° C. A large crucible 50 has a lid 51, and a small crucible 60 and activated carbon 53 are put in a vessel 52. In the small crucible 60, potassium hydroxide (KOH) 18 is mixed on the carbide 19 in a vessel 62, and a lid 61 is provided. Stable fine ceramic material or the like is considered as the material of the small crucible 60 and the large crucible 50, and aluminum oxide $Al_2O_3$ or the like is used.

Third Embodiment

The same reference numerals are given to configurations the same as those in the first embodiment and a description thereof will be omitted. In FIG. 5, the carbon source 9 produced from the vegetable material in the pretreatment process S1 as described in the first embodiment and oxidation inhibiting substance 70 are placed in a pot 83. Here, it is preferable that the volume of the carbon source 9 is about $1/10$ to $2/3$ of the capacity of the pot 83. In the pretreatment process S1, it is possible to only pulverize the carbon source 9 with a mill or the like without using a granulating agent.

Here, the oxidation inhibiting substance 70 may be any substance as long as the substance enables burning while suppressing oxygen concentration in order to prevent oxidation at the time of burning, and a gas or a liquid of a halide (carbon dioxide, nitrogen, Halon 2402, Halon 1121, Halon 1301) may be mixed and burned.

Thereafter, the atmosphere in a furnace 81 of a combustion furnace 80 is set to 800° C. or higher, and the carbon source 9 is burned for 3 hours under the conditions of 20 atm and 400° C. or higher and 900° C. or lower.

The present embodiment represents the carbonization process S2.

Fourth Embodiment

Process Flow 1

With reference to FIG. 1, production processes for a method of producing graphene will be described mainly with reference to the second embodiment described above. FIG. 1 is a diagram illustrating a process flow depicting production processes according to an embodiment.

First, in the pretreatment process S1, after the vegetable material is dried as described above, the vegetable material is pulverized, and the pulverized vegetable material and a granulating agent are mixed in the ratio of 10 to 1 with water, the mixture is divided into an appropriate size and is kneaded and heated to about 100° C. on a drying device such as a hot plate to evaporate water content and to produce the carbon source 9. Here, examples of the pulverizing method include a mill, a blender, a grinder, and the like.

Next, the carbonization process S2 will be described. In the pretreatment process S1, about 0.8 g of the carbon source 9 is put in the crucible 5 and covered with a metal net or the like. The crucible 5 is disposed at a predetermined heating location in the plasma device 10, 100 described above. The pressure inside the chamber 1 is reduced to 80 Pa by the vacuum pump 30 and the inert gas 6 is injected into the chamber 1 at a flow rate of 8 to 10 ml/min, and the inside of the chamber 1 is maintained at a pressure of 1300 to 1500 Pa. Note that in the carbonization process S2, similar graphene can be produced even if the first embodiment and the third embodiment are adopted.

As illustrated in FIG. 6, the applicant performed the carbonization process S2 in a range from 200° C. to 1100° C. in an increment of 100° C. by thermal plasma, and obtained the temperatures and yields when the carbon source 9 was carbonized. The value obtained by dividing the weight of the carbide 19 obtained from 0.8 g of the carbon source 9 by 0.8 g (the weight of the carbon source 9) is illustrated in FIG. 6. The highest yield of 36% was obtained in a range from 600° C. to 700° C., and relatively large yields were obtained in a range from 300° C. to 1000° C. inclusive. In this measurement, rice straw, rice bran, coconut shell, chaff, and peanut shell, and the like were used, and similar results were obtained.

Next, the purification process S3 will be described. Potassium hydroxide (KOH) 18 is mixed with the carbide 19 obtained as described above in a weight ratio of 5 to 1, the mixture is put in the vessel 62 of the small crucible 60 illustrated in FIG. 4, and the lid 61 is put on the small crucible 60. In addition, the small crucible 60 is accommodated in the large crucible 50, and the activated carbon 53 is filled around the small crucible 60. The activated carbon 53 is filled in order to prevent entry of oxygen into the small crucible 60. In the heating furnace 41, the furnace 42 is heated to a temperature close to 950° C. and firing is performed for about 2 to 3 hours.

Here, since potassium hydroxide 18 promotes removal of silicon, the potassium hydroxide 18 is used from the viewpoint of improving the yield of graphene. Examples of bases are alkali metal hydroxides such as sodium hydroxide and lithium hydroxide, alkaline earth metal hydroxides such as magnesium hydroxide and calcium hydroxide, alkali metal oxides such as sodium oxide and potassium oxide, alkaline earth metal oxides such as magnesium oxide and calcium oxide, alkali metal sulfides such as sodium sulfide and potassium sulfide, and alkaline earth metal sulfides such as magnesium sulfide and calcium sulfide. It is also conceivable to remove lignin that cannot be carbonized by using one or more acids selected from the group consisting of hydrochloric acid, sulfuric acid, PTSA, and aluminum chloride.

In the carbide 19 which reacted with potassium hydroxide, silicic acid reacts with potassium hydroxide 18 to become potassium silicate, remaining water-soluble potassium hydroxide (KOH) 18 (FIG. 4) and potassium silicate are dissolved in water, filter paper is set for the liquid mixture, the liquid mixture is made to pass through a filter in a vacuum or reduce-pressure state, and thus silicon oxide (silicon) is removed from the liquid mixture. In the purification process S3 in which drying is performed, graphene 113 which is a final product whose weight is about ⅛ to ⅒ of the weight of the vegetable material when the vegetable material is granulated at first was to be produced.

Fifth Embodiment

With reference to FIGS. 14 to 17C, the present embodiment is a carbide producing device 200 which enables further mass production and designed based on the plasma devices 10, 100 for producing the carbide 19 described above.

The carbide producing device 200 is provided with a plurality of storage containers 205 inside a see-through quartz tube 203 in order to mainly enable mass production. The storage container 205 is made of carbon or composite material of carbon and is configured to accommodate the carbon source 9 which is a vegetable material.

First, with reference to FIGS. 14 and 15, the carbide producing device 200 will be described. The transparent columnar quartz tube 203 is provided between a left flange 231 and a right flange 232. The left and right flanges 231, 232 enable the quartz tube 203 to be sealed and opened such that the inside of the quartz tube 203 can be maintained in a vacuum state or a low pressure state. In addition, the quartz tube 203 can be detached from one of the left and right flanges 231, 232 which is opened. The left and right flanges 231, 232 have a water cooling type cooling function.

Note that the quartz tube 203 may be detached and fixed from both sides of the left and right flanges 231, 232 so as to be sandwiched by the left and right flanges 231, 232.

As illustrated in FIG. 14, the right flange 232 is connected to a pipe connected to a control valve 224 for controlling the flow rates of an inert gas 217 and a combustion gas 218. Therefore, the quartz tube 203 can be filled with the inert gas 217 or the combustion gas 218. In addition, the right flange 232 is connected to a low vacuum pressure gauge 219, and the left flange 231 is connected to a pressure control valve 222 and the control valve 224 with a filter 221 interposed therebetween.

In addition, the control valve 224 allows one of the inert gas 217 and the combustion gas 218 to flow into the quartz tube 203 in a switchable manner according to the temperature condition and the burning time depending on the process or intended use.

The control device 210 controls the pressure inside the quartz tube 203 by using a dry pump 223 connected to the pressure control valve 222 and the control valve 224.

As illustrated in FIGS. 14 and 15, the carbide producing device 200 includes a high-frequency coil 240 and an electric furnace 250 so that various temperatures can be reached in the quartz tube 203, not only carbon but also silica can be extracted from the carbon source 9 which is a vegetable material, and the carbide producing device 200 can also be used in the above-described purification process S3.

The high-frequency coil 240 is formed so as to surround the periphery of the quartz tube 203, and a coil support tool 242 for supporting a coil 243 is fixed to a driving device 1 (214). The driving device 1 (214) moves along rails 236 in the X, −X directions. A motor is used as the driving device 1 (214). Note that as the drive source of the driving device 1 (214) or a driving device 2, linear driving or the like may be used in lieu of the motor.

Although the principle and production processes of the carbide producing device 200 are the same as those of the plasma device 100 of the second embodiment described above, the carbide producing device 200 differs from the plasma device 100 in that the high-frequency coil 240 is movable in the X and −X directions. Once the high-frequency coil 240 is installed, it is possible to sequentially carbonize the plurality of storage containers 205 accommodating the carbon sources 9. Therefore, it is possible to carbonize a large amount of the carbon sources 9 at a time. Mainly, in the production processes, the high-frequency coil 240 can be utilized in the carbonization process S2 in FIG. 1 described above.

In addition, the high-frequency coil 240 is provided with a shielding plate 241 in the vicinity of the coil 243 in order to reduce the influence of electromagnetic waves emitted from the coil 243.

The carbide producing device 200 makes the inert gas 217 flow and applies a high-frequency magnetic field of 4 MHz from a high-frequency power supply 212 to the high-frequency coil 240. Therefore, as illustrated in FIG. 6, thermal plasma was generated and relatively large yields were obtained in a range from 300° C. to 1000°) C inclusive. Argon was mainly used as the inert gas 217; however, examples of the inert gas 217 include helium, neon, and nitrogen.

By using the high-frequency coil 240 and the inert gas 217 as described above, even lignin which is difficult to be thermally decomposed can be decomposed. In addition, the carbide producing device 200 is optimal for mass production since no toxic substances and the like are generated in the production processes.

Note that besides the plasma devices described above, there is a method of producing thermal plasma by a plasma device using barrier discharge, corona discharge, pulse discharge, and DC discharge.

The high-frequency power supply 212 is provided with a water-cooling type cooling device 213 for cooling the coil 243 and the power supply. A filter 221 formed of a nonwoven fabric, cotton, paper, or the like is provided in order to prevent a tar component or the like generated during burning in the quartz tube 203 from affecting the dry pump 223.

In addition, in a temperature control device 211 illustrated in FIG. 14, a thermocouple 235 is provided close to each storage container 205 as illustrated in FIG. 15. Therefore, according to information obtained from the temperature control device 211, the control device 210 can perform carbonization while keeping a desired temperature. In particular, temperature control is important because the yield changes depending on the temperature, and the carbide producing device 200 can extract not only the carbide 19 but also a large amount of silica from the vegetable material by controlling the temperature.

The electric furnace 250 is formed so as to surround the periphery of the quartz tube 203, and is fixed to the driving device 2 (216). The driving device 2 (216) moves along the rails 236 in the X, −X directions. A motor is used as the driving device 2 (216). Note that linear driving or the like may be used in lieu of the motor.

The electric furnace 250 can raise the temperature up to about 2000° C. by using heat from a heating element provided, for example, using Joule heating, and it is possible to burn the inside of the quartz tube 203 when the carbon source 9 or the carbide 19 is refined while supplying the combustion gas 218.

In addition, the electric furnace 250 can remove soot attached to the quartz tube 203 which is originally transparent and clean the quartz tube 203 by supplying oxygen serving as the combustion gas 218, heating the quartz tube 203, and removing adhered soot as $CO_2$. As a result, it is possible to prevent the temperature of thermal plasma produced by the high-frequency coil 240 from being lowered, and to properly control the temperature.

In addition, the combustion gas 218 is used for assisting burning, and oxygen or the like is considered as the combustion gas 218.

Note that the combustion gas 218 is used in a process in the purification process S3 illustrated in FIG. 1 and is used for burning at about 1000° C.

Note that the electric furnace 250 may be a low-frequency induction furnace utilizing electromagnetic induction current, a high-frequency induction furnace utilizing eddy current, an arc furnace utilizing high heat of arc light, or the like.

Next, with reference to FIGS. 15 to 17C, the quartz tube 203 and the storage container 205 will be described.

As illustrated in FIGS. 16 and 17B, the storage container 205 is formed of carbon material in a box shape with the upper end thereof opened so as to store the carbon source 9 or the carbide 19 therein. In particular, the carbide producing device 200 is provided with the plurality of storage containers 205 so that more carbon sources 9 can be carbonized than the amount of carbon source carbonized by each of the above-described plasma devices 10, 100.

The storage container 205 is fixed to a mounting table 206 including a plurality of upper end piece portions 208 which are rod-shaped projecting pieces and provided at four corners on a front surface of the mounting table 206, and a plurality of lower end piece portions 207 which has a piece shape and projects downward at both ends on the back surface of the mounting table 206. A hole into which the piece of the upper end piece portion 208 can be inserted is formed in the storage container 205, the hole being positioned at the location the same as the position of the upper end piece portion 208 located below. The upper end piece portion 208 is fitted in the hole, and the storage container 205 is fixed to the mounting table 206.

The mounting table 206 to which the storage container 205 is fixed is mounted on a base 202 such that the lower end piece portions 207 are fitted into base grooves 204 which are groove provided in the base 202. A plurality of the base grooves 204 is provided such that the base grooves 204 are shifted from each other by Y1 in the width direction so that the storage containers 205 can be disposed so as to be shifted from each other. In addition, the storage containers 205 are separated not only in the width direction but also in the X direction by a predetermined distance X1 as illustrated in FIG. 15.

As illustrated in FIGS. 15 and 16, by separating the storage containers 205 in the Y1 direction or the X direction, it is attempted to prevent the storage container 205 other than the target of carbonization from being affected as much as possible during carbonization caused by plasma heat. In addition, in order to enable temperature control, in the base 202, a thermocouple storage space 209 which is a space in which the thermocouple can be fixed is secured in the vicinity of the base groove 204.

As illustrated in FIG. 16, the quartz tube 203 is formed in a circular tube shape made of transparent quartz and having an outer diameter of about 125 mm. In addition, the base 202 is formed to have a width such that the storage container 205 can be disposed below the center of the inside of the chamber of the quartz tube 203.

Even though the carbide producing device 200 is configured to obtain carbon, it is also possible to extract silica from the above-described biomass material depending on temperature conditions, and in particular, it is possible to produce amorphous silica. In addition, the electric furnace 250 enables not only the carbonization process S2 described above but also the purification process S3. Therefore, it is possible to perform various processes while controlling the temperature with the identical device.

In the above carbide producing device 200, since the high-frequency coil 240 or the electric furnace 250, which is a portion applying heat, moves to heat the carbon source 9 contained in the storage container 205, it is easier to create a space in which pressure can be controlled than in the case of a conveyor type device in which raw material moves. In addition, in the conveyor type device, there is a concern over chemical reaction with oil required for a conveyor or the like, which may cause mixture of impurities. In addition, compared to the conveyor type device, in the carbide producing device 200, there is no risk of an increase in cost due to complication of the device caused by mixture of an inert gas or the like. Since the carbide producing device 200 is provided outside the quartz tube 203, inspection and maintenance work from the outside is also easy.

In addition, it is also possible to use one device in processes in a carbonization process S2 or a purification process S3 to be described later. Further, the carbide producing device 200 can also produce graphene by changing the temperature conditions. As described above, since the carbide producing device 200 is a multifunctional device, the device is not only excellent in production efficiency but can be applied to various purposes.

Sixth Embodiment

Process Flow 2

With reference to FIG. 1, production processes for a method of producing graphene using the carbide producing device 200 according to the fifth embodiment will be described with reference to FIG. 1. Note that since a pretreatment process S1 is identical to the pretreatment process S1 in the process flow 1 according to the above-described fourth embodiment, a description thereof will be omitted.

The carbonization process S2 in the case of using the carbide producing device 200 illustrated in FIGS. 14 to 17C according to the present embodiment will be described. In the pretreatment process S1, the carbon source 9 is laid in the storage container 205 and covered with a metal net made of stainless steel or the like. The plurality of storage containers 205 is disposed so as to be shifted from each other in the predetermined heating location in the carbide producing device 200 described above. The pressure inside the quartz tube 203 is reduced to 80 Pa by the dry pump 223 and the inert gas 217 is injected into the quartz tube 203 at a flow rate of 8 to 10 ml/min, and the inside of the chamber 1 is maintained at a pressure of 1300 Pa to 1500 Pa.

As illustrated in FIG. 6, the applicant performed the carbonization process S2 in a range from 200° C. to 1100°

C. in an increment of 100° C. by thermal plasma, and obtained the temperatures and yields when the carbon source 9 was carbonized. The value obtained by dividing the weight of the carbide 19 obtained from 0.8 g of the carbon source 9 by 0.8 g (the weight of the carbon source 9) is illustrated in FIG. 6. The highest yield of 36% was obtained in a range from 600° C. to 800° C., and relatively large yields were obtained in a range from 300° C. to 1000° C. inclusive. In this measurement, rice straw, rice bran, coconut shell, chaff, and peanut shell, and the like were used, and similar results were obtained.

Next, the purification process S3 will be described. Potassium hydroxide (KOH) 18 is mixed with the carbide 19 obtained as described above in a weight ratio of 5 to 1, the mixture is put in the vessel 62 of the small crucible 60 illustrated in FIG. 4, and the lid 61 is put on the small crucible 60. In addition, the small crucible 60 is accommodated in the storage container 205 illustrated in FIG. 17B, and the activated carbon 53 is filled around the small crucible 60. The activated carbon 53 is filled in order to prevent entry of oxygen into the small crucible 60. The electric furnace 250 heats the inside of the quartz tube 203 to a temperature close to 950° C. and firing is performed for about 2 to 3 hours.

Here, since the potassium hydroxide 18 promotes removal of silicon, the potassium hydroxide 18 is used from the viewpoint of improving the yield of the graphene 113. Examples of bases are alkali metal hydroxides such as sodium hydroxide and lithium hydroxide, alkaline earth metal hydroxides such as magnesium hydroxide and calcium hydroxide, alkali metal oxides such as sodium oxide and potassium oxide, alkaline earth metal oxides such as magnesium oxide and calcium oxide, alkali metal sulfides such as sodium sulfide and potassium sulfide, and alkaline earth metal sulfides such as magnesium sulfide and calcium sulfide. It is also conceivable to remove lignin that cannot be carbonized by using one or more acids selected from the group consisting of hydrochloric acid, sulfuric acid, PTSA, and aluminum chloride.

In the carbide 19 which reacted with potassium hydroxide, silicic acid reacts with the potassium hydroxide 18 to become potassium silicate, remaining water-soluble potassium hydroxide (KOH) 18 (FIG. 4) and potassium silicate are dissolved in water, filter paper is set for the liquid mixture, water content is quickly filtered by passing the liquid mixture through a filter in a vacuum or reduce-pressure state, and thus silicon or silicon oxide is removed from the liquid mixture. In the purification process S3 in which drying is performed, graphene which is a final product whose weight is about 1/8 to 1/10 of the weight of the vegetable material when the vegetable material was granulated at first was able to be produced.

Graphene obtained in the present invention is used for battery material such as a negative electrode material, an electric wire, a reinforced composite material of rubber or resin, a material of carbon fiber, and the like.

1 Chamber
2 Cathode
3 Anode
4, 32 High-frequency power supply
5 Crusible
6, 217 Inert gas
7 Introduction pipe
8 Lead-out pipe
9 Carbon source
10, 100 Plasma device
14, 22, 224 Control valve
15, 23 Leak valve
19 Carbide
20 Control device
21 Gas amount control device
30 Vacuum pump
31, 240 High-frequency coil
40 Impurity removing device
41 Heating furnace
42, 81 Furnace
50 Large crusible
51, 61 Lid
52, 62 Vessel
53 Activated carbon
60 Small crusible
70 Oxidation inhibiting substance
80 Combustion furnace
83 Pot
200 Carbide producing device
202 Base
203 Quartz tube
204 Base groove
205 Storage container
206 Mounting table
207 Lower end piece portion
208 Upper end piece portion
209 Storage space
210 Control device
211 Temperature control device
212 High-frequency power supply
213 Cooling device
214 Driving device 1
215 Power supply control device
216 Driving device 2
218 Combustion gas
219 Low vacuum pressure gauge
221 Filter
223 Dry pump
224 Control valve
231 Left flange
232 Right flange
235 Thermocouple
236 Rail
241 Shielding plate
242 Coil support tool
243 Coil
250 Electric furnace
S1 Pretreatment process
S2 Carbonization process
S3 Purification process.

What is claimed is:

1. A method for producing graphene comprising:
pretreating comprising drying and pulverizing a vegetable material to obtain a carbon source; and
carbonizing the carbon source to obtain graphene,
wherein the carbonizing comprises supplying the carbon source, supplying a halide, and heating the carbon source at a temperature of 400° C. or higher and 900° C. or lower, and
wherein the vegetable material contains 13% or more and 35% or less of silicon.

* * * * *